United States Patent
Powers

(10) Patent No.: US 10,415,343 B2
(45) Date of Patent: Sep. 17, 2019

(54) CONSUMABLE DOWNHOLE PACKER OR PLUG

(71) Applicant: Weatherford Technology Holdings, LLC, Houston, TX (US)

(72) Inventor: Geoffrey Powers, Houston, TX (US)

(73) Assignee: WEATHERFORD TECHNOLOGY HOLDINGS, LLC, Houston, TX (US)

(*) Notice: Subject to any disclaimer, the term of this patent is extended or adjusted under 35 U.S.C. 154(b) by 228 days.

(21) Appl. No.: 15/276,492

(22) Filed: Sep. 26, 2016

(65) Prior Publication Data

US 2017/0009553 A1   Jan. 12, 2017

Related U.S. Application Data

(62) Division of application No. 14/164,809, filed on Jan. 27, 2014, now Pat. No. 9,482,069.

(60) Provisional application No. 61/774,137, filed on Mar. 7, 2013.

(51) Int. Cl.
| | |
|---|---|
| E21B 33/12 | (2006.01) |
| B29C 48/05 | (2019.01) |
| B29C 48/154 | (2019.01) |
| E21B 29/02 | (2006.01) |
| E21B 23/00 | (2006.01) |
| B29K 105/08 | (2006.01) |
| B29L 31/26 | (2006.01) |

(Continued)

(52) U.S. Cl.
CPC .......... *E21B 33/1208* (2013.01); *B29C 48/05* (2019.02); *B29C 48/154* (2019.02); *E21B 23/00* (2013.01); *E21B 29/02* (2013.01); *E21B 33/12* (2013.01); *B29K 2105/08* (2013.01); *B29L 2031/26* (2013.01); *E21B 43/11* (2013.01); *E21B 43/26* (2013.01)

(58) Field of Classification Search
CPC .......... E21B 23/00; E21B 29/02; E21B 33/12; E21B 33/1208; E21B 43/11; E21B 43/26; B29C 47/0014; B29C 47/025; B29K 2105/08; B29L 2031/26; D01H 1/36
See application file for complete search history.

(56) References Cited

U.S. PATENT DOCUMENTS

| | | |
|---|---|---|
| 6,948,535 B2 | 9/2005 | Stegemoeller |
| 7,383,876 B2 | 6/2008 | Gray et al. |
| 7,591,318 B2 | 9/2009 | Tilghman |

(Continued)

FOREIGN PATENT DOCUMENTS

WO   2010019252 A1   2/2010

OTHER PUBLICATIONS

"Definition of Reacting by the Free Dictionary", American Heritage Dictionary of the English Language, 5th Edition, Copyright 2016 by Houghton Mifflin Harcourt Publishing Company, The Free Ditctionary by Farlex, http://www.thefreedictionary.com/reacting, Jan. 7, 2019. (Year: 2019).*

(Continued)

*Primary Examiner* — Caroline N Butcher
(74) *Attorney, Agent, or Firm* — Patterson + Sheridan, LLP

(57) ABSTRACT

A packer or plug for use in a wellbore includes: a tubular mandrel made from a composite material including a pyrotechnic composition; an expandable seal disposed on an outer surface of the mandrel; and an igniter operable to initiate combustion of the mandrel.

13 Claims, 10 Drawing Sheets

(51) Int. Cl.
*E21B 43/11* (2006.01)
*E21B 43/26* (2006.01)

(56) References Cited

U.S. PATENT DOCUMENTS

| | | |
|---|---|---|
| 7,799,408 B2 | 9/2010 | Hori et al. |
| 7,819,048 B2 | 10/2010 | Facciano et al. |
| 8,127,856 B1 | 3/2012 | Nish et al. |
| 8,235,102 B1 | 8/2012 | Robertson |
| 8,268,222 B2 | 9/2012 | Aisenbrey |
| 8,291,970 B2 | 10/2012 | Swor et al. |
| 8,322,426 B2 | 12/2012 | Wright et al. |
| 9,482,069 B2 | 11/2016 | Powers |
| 2005/0281968 A1 | 12/2005 | Shanholtz et al. |
| 2007/0202001 A1 | 8/2007 | Stournaras et al. |
| 2008/0017379 A1 | 1/2008 | Tilghman |
| 2009/0011247 A1 | 1/2009 | Barlow et al. |
| 2011/0024103 A1 | 2/2011 | Storm, Jr. et al. |
| 2011/0204299 A1 | 8/2011 | Noda et al. |
| 2012/0199340 A1* | 8/2012 | Robertson ............... E21B 17/06 166/179 |
| 2012/0292053 A1 | 11/2012 | Xu et al. |

OTHER PUBLICATIONS

Donald R. Askeland, Excerpt from the Science and Engineering of Materials, Third Edition, PWS Publishing Company, Boston, MA, 1984, pp. 553 and 569.
Ebay Listing of Pencil: Rare Inert WWII U.S. Delay Time Pencil for Blasting, Mar. 6, 2011.
PCT International Search Report and Written Opinion dated Feb. 17, 2015, for International Application No. PCT/US2014/021332.

* cited by examiner

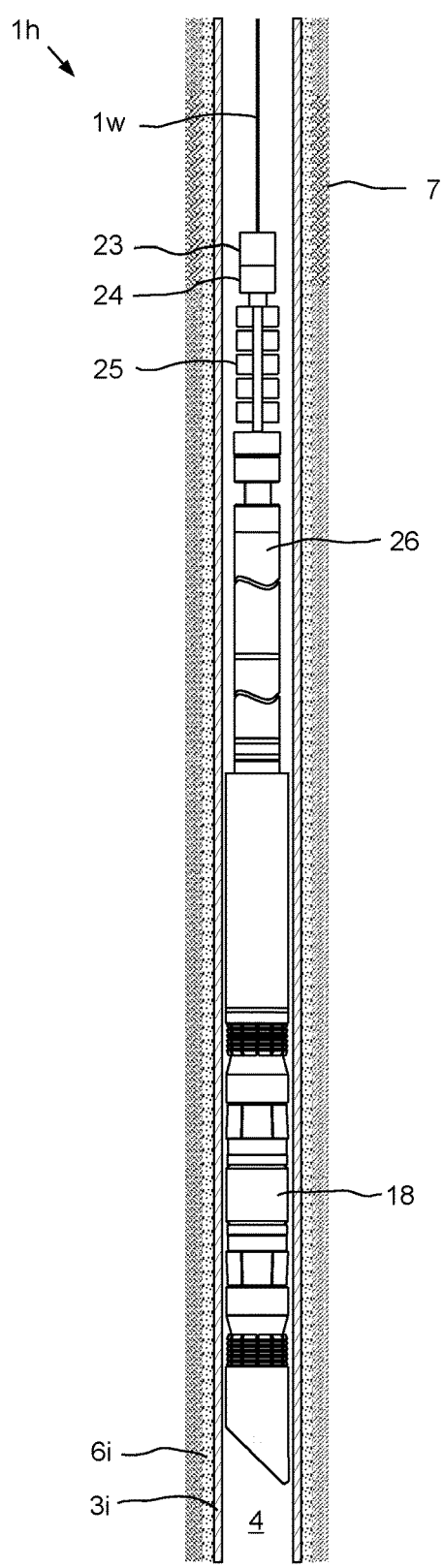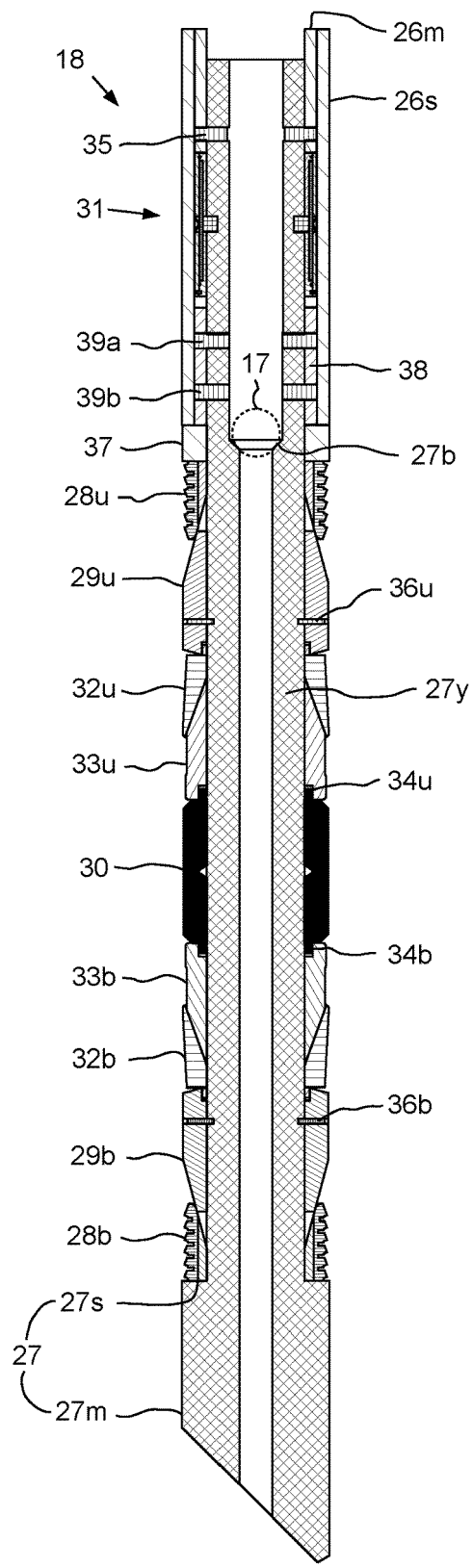
FIG. 1B
FIG. 2

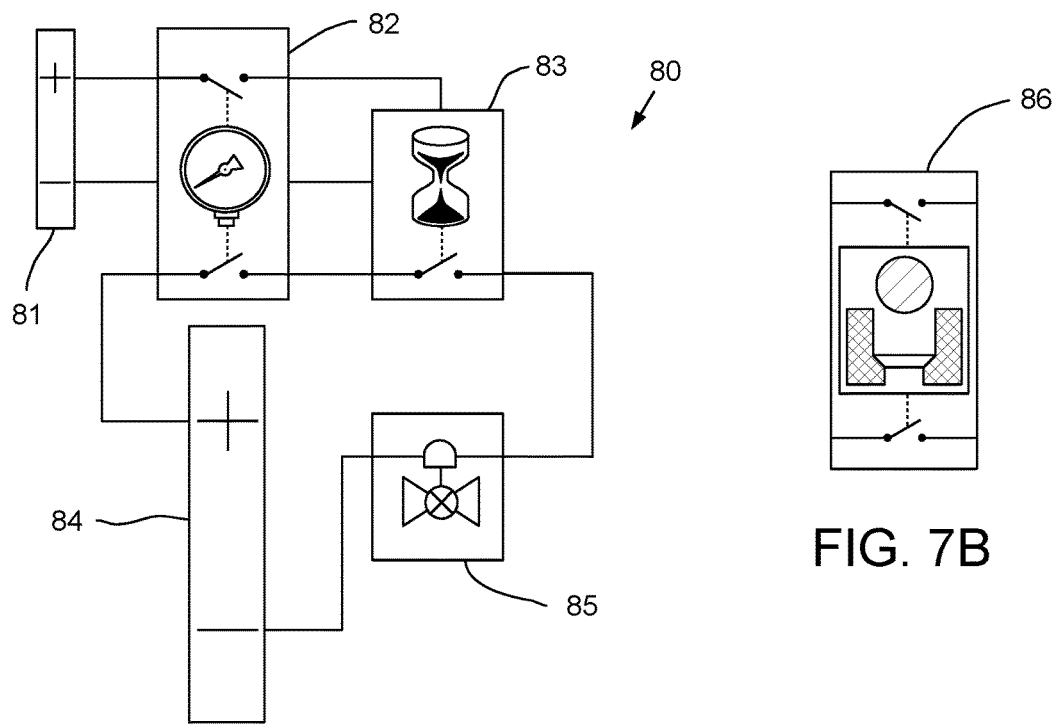
FIG. 7A
FIG. 7B
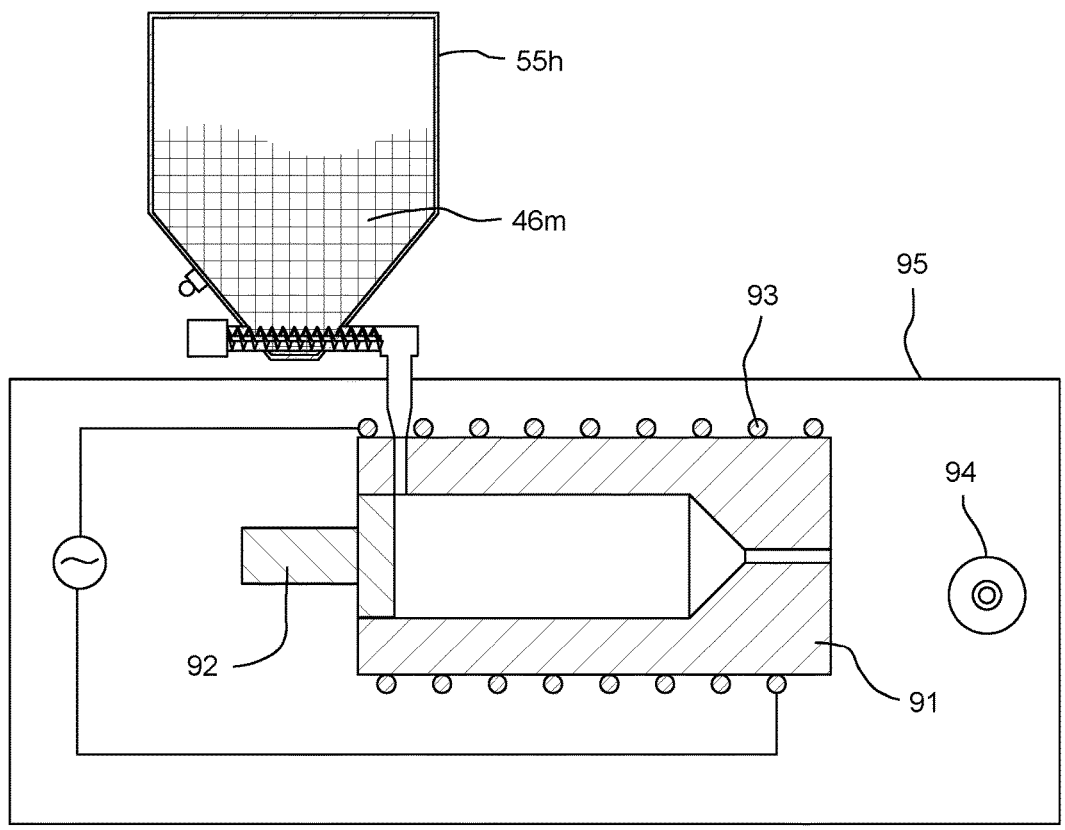
FIG. 8

US 10,415,343 B2

CONSUMABLE DOWNHOLE PACKER OR PLUG

BACKGROUND OF THE INVENTION

Field of the Invention

The present invention generally relates to a consumable downhole packer or plug.

Description of the Related Art

Hydraulic fracturing (aka fracing or fracking) is an operation for stimulating a subterranean formation to increase production of formation fluid, such as crude oil and/or natural gas. A fracturing fluid, such as a slurry of proppant (i.e., sand), water, and chemical additives, is pumped into the wellbore to initiate and propagate fractures in the formation, thereby providing flow channels to facilitate movement of the formation fluid into the wellbore. The fracturing fluid is injected into the wellbore under sufficient pressure to penetrate and open the channels in the formation. The fracturing fluid injection also deposits the proppant in the open channels to prevent closure of the channels once the injection pressure has been relieved. Typically, a wellbore will intersect several hydrocarbon-bearing production zones. Each zone may have a different fracture pressure. To ensure that each zone is treated, each zone is treated separately while isolating a previously treated zone from the next zone to be treated using a frac plug.

SUMMARY OF THE INVENTION

The present invention generally relates to a consumable downhole packer or plug. In one embodiment, a packer or plug for use in a wellbore includes: a tubular mandrel made from a composite material including a pyrotechnic composition; an expandable seal disposed on an outer surface of the mandrel; and an igniter operable to initiate combustion of the mandrel.

In another embodiment, a method of manufacturing a downhole packer or plug includes: mixing polymer reagents and a pyrotechnic composition, thereby forming a resin; guiding fibers through the resin, thereby coating the fibers; consolidating the coated fibers into a fiber bundle; and rotating a winding mandrel to spool the fiber bundle, thereby forming a component of the packer or plug.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A and 1B illustrate a fracturing system, according to one embodiment of the present invention.

FIG. 2 illustrates a consumable frac plug of the system.

FIG. 7A illustrates an electronic trigger for use with either igniter, according to another embodiment of the present invention. FIG. 7B illustrates an alternative switch for the electronic trigger, according to another embodiment of the present invention.

FIG. 8 illustrates an alternative manufacturing system for an alternative consumable mandrel, according to another embodiment of the present invention.

DETAILED DESCRIPTION

Figure 1A:
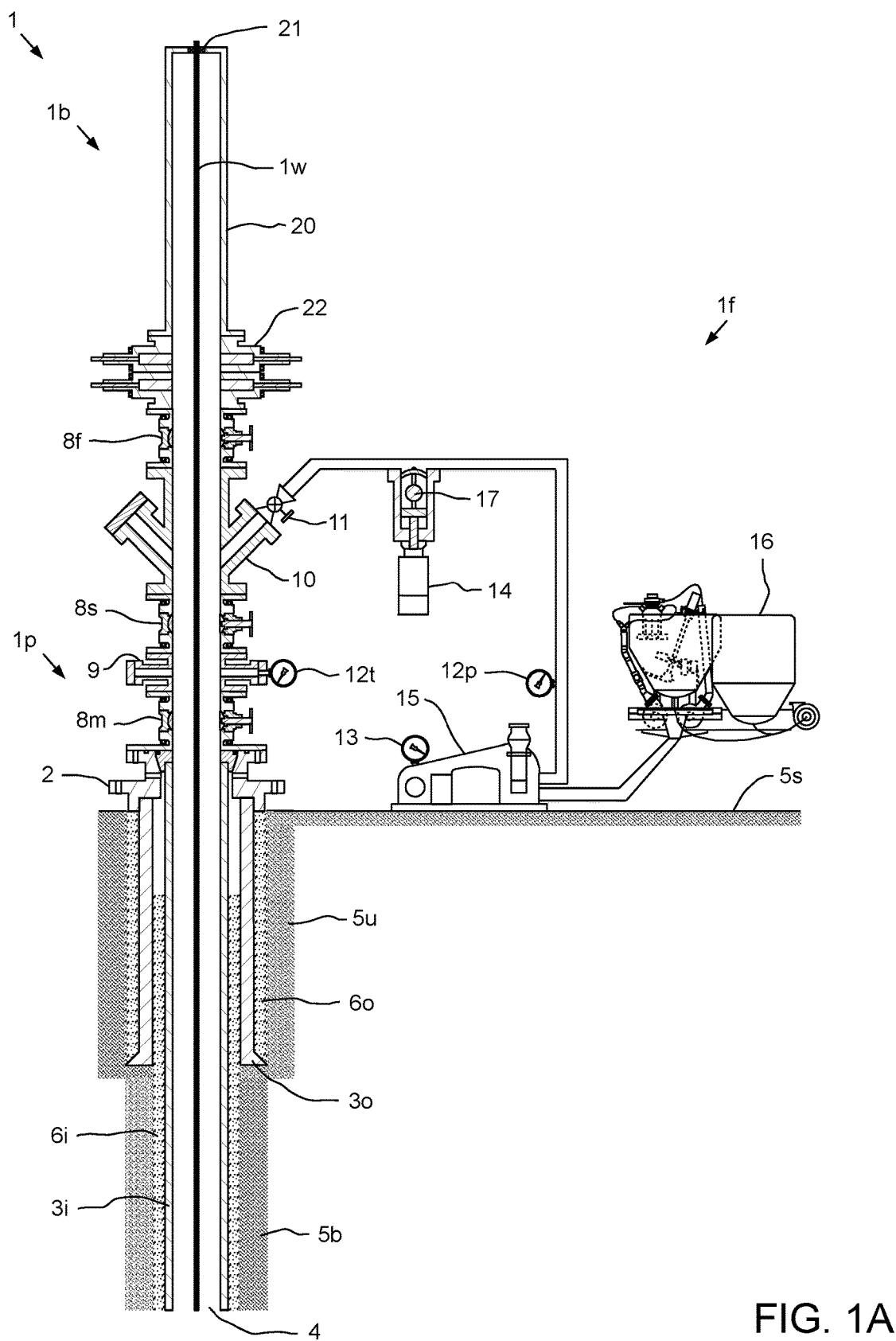

FIGS. 1A and 1B illustrate a fracturing system 1, according to one embodiment of the present invention. The fracturing system 1 may include a lubricator 1b, a fluid system 1f, a production tree 1p, a work line, such as wireline 1w, and a bottomhole assembly (BHA) 1h.

Alternatively, the work line may be slick line or sand line. Alternatively, a work string, such as coiled tubing, may be used instead of the work line.

A wellhead 2 may be mounted on an outer casing string 3o which has been deployed into a wellbore 4 drilled from a surface 5s of the earth and cemented 6o into the wellbore. An inner casing string 3i has been deployed into the wellbore 4, hung from the wellhead 2, and cemented 6i into place. The outer casing string 3o may extend to a depth adjacent a bottom of an upper formation 5u and the inner casing string 3i may extend through a lower formation 5b. The upper formation 5u may be non-productive and the lower formation 5b may be a hydrocarbon-bearing reservoir having one or more production zones 7 (only one shown).

Alternatively, although shown as vertical, the wellbore 4 may include a vertical portion and a deviated, such as horizontal, portion.

The production tree 1p may be installed on the wellhead 2. The production tree 1p may include a master valve 8m, a flow cross 9, and a swab valve 8s. Each component of the production tree 1p may be connected together, the production tree may be connected to the wellhead 2 and an injector head 10, and the lubricator 1b may be connected to the injector head, such as by flanges and studs or bolts and nuts.

The fluid system 1f may include the injector head 10, shutoff valve 11, one or more gauges, such as the pressure gauges 12p,t and a stroke counter 13, a launcher 14, a fracture pump 15, and a fracture fluid mixer, such as a recirculating mixer 16. The pressure gauge 12t may be connected to the flow cross 9 and may be operable to monitor wellhead pressure. The pressure gauge 12p may be connected between the fracture pump 15 and the valve 11 and may be operable to measure discharge pressure of the fracture pump 15. The stroke counter 13 may be operable to measure a flow rate of the fracture pump 15.

Alternatively, the gauges may be sensors in data communication with a programmable logic controller (PLC) (not shown) for automated or semi-automated control of the fracturing operation.

The launcher 14 may include a housing, a plunger, and an actuator. A pump-down plug, such as a ball 17, may be disposed in the plunger for selective release and pumping downhole to close a bore of a consumable frac plug 18 of the BHA 1h. The plunger may be movable relative to the housing between a capture position and a release position. The plunger may be moved between the positions by the actuator. The actuator may be hydraulic, such as a piston and cylinder assembly. In operation, a technician may release the ball 17 by operating the launcher actuator. The launcher actuator may then move the plunger to the release position (not shown). The carrier and ball 17 may then move into a discharge conduit connecting the fracture pump 15 to the injector head 10. The pumped stream of fracturing fluid 19 (FIG. 5C) may then carry the ball 17 from the launcher 14, into the wellhead 2 via the injector head 10 and tree 1p, and to the frac plug 18.

Alternatively, the actuator may be electric, pneumatic, or manual, such as a handwheel.

The lubricator 1b may include a tool housing 20 (aka lubricator riser), a seal head 21, one or more blowout preventers 22, and the shutoff valve 8f. Components of the lubricator 1b may be connected, such as by flanged connections. The shutoff valve 8f may also have a lower flange for connecting to an upper flange of the injector head 10. The seal head 21 may include a stuffing box and a grease injector. The stuffing box may include a packing, a piston, and a housing. A port may be formed through the housing in communication with the piston. The port may be connected to a hydraulic power unit (not shown) of a service truck (not shown) via a hydraulic conduit (not shown). When operated by hydraulic fluid, the piston may longitudinally compress the packing, thereby radially expanding the packing inward into engagement with the wireline 1w.

The grease injector may include a housing integral with the stuffing box housing and one or more seal tubes. Each seal tube may have an inner diameter slightly larger than an outer diameter of the wireline 1w, thereby serving as a controlled gap seal. An inlet port and an outlet port may be formed through the grease injector/stuffing box housing. A grease conduit (not shown) may connect an outlet of a grease pump (of the service truck) with the inlet port and another grease conduit (not shown) may connect the outlet port with a grease reservoir. Grease (not shown) may be injected from the grease pump into the inlet port and along the slight clearance formed between the seal tube and the wireline 1w to lubricate the wireline 1w, reduce pressure load on the stuffing box packing, and increase service life of the stuffing box packing.

The BHA 1h may include a cablehead 23, a casing collar locator (CCL) 24, a perforation gun 25, a setting tool 26, and the consumable frac plug 18. The cablehead 23, CCL 24, and perforation gun 25 may be connected together, such as by threaded connections or flanges and studs or bolts and nuts. The perforation gun 25 may include a firing head and a charge carrier. The charge carrier may include a housing, a plurality (ten shown) of shaped charges, and detonation cord connecting the charges to the firing head. In operation, the firing head may receive electricity from the wireline 1w to operate an electric match thereof. The electric match may ignite the detonation cord to fire the shape charges.

The setting tool 26 may include a mandrel 26m (FIG. 2) and a piston 26s longitudinally movable relative to the mandrel. The mandrel 26m may be connected to the perforation gun and fastened to a mandrel 27 of the frac plug 18, such as by shearable pins 35, screws, or ring. The setting tool 26 may include a firing head and a power charge. In operation, the firing head may receive electricity from the wireline 1w to operate an electric match thereof and fire the power charge. Combustion of the power charge may create high pressure gas which exerts a force on the setting piston 26s.

Alternatively, a hydraulic pump may be used instead of the power charge to drive the setting piston. If coiled tubing is used instead of the wireline, high pressure fluid may be injected through the coiled tubing to drive the setting piston.

FIG. 2 illustrates the consumable frac plug 18. The frac plug 18 may include a consumable mandrel 27, one or more anchors, such as upper 28u and lower 28b slips and respective upper 29u and lower 29b slip cones, an expandable sealing member, such as packing element 30, and an igniter 31. The frac plug 18 may further include one or more packing supports, such as upper 32u and lower 32b expansion rings and respective upper 33u and lower 33b support cones. The frac plug 18 may be made from one or more drillable materials. The cones 29u,b and 33u,b may be made from a composite material. The composite material may include a polymer matrix reinforced by continuous fibers such as glass, carbon, or aramid (including para-aramids and meta-aramids). The polymer matrix may be epoxy, polyurethane or phenolic. The slips 28u,b may be made from a non-steel metal or alloy, such as cast iron. The packing element 30 may be made from a polymer, such as an elastomer or elastomer copolymer. The expansion rings 32u,b may be made from an engineering polymer, such as polytetrafluoroethylene (PTFE) or polyetheretherketone (PEEK).

The plug components 28-34 may be disposed along an outer surface of the mandrel 27. The packing element 30 and packing supports 32u,b, 33u,b may be disposed between the slip cones 29u,b and the upper 32u, 33u and lower 32b, 33b packing supports may straddle the packing element. A seal, such as an o-ring 34u,b, may be disposed between each support cone 33u,b and the mandrel 27 to seal the interface formed therebetween. The expansion rings 32u,b may be disposed along the mandrel 27 between the support cones 33u,b, and the slip cones 29u,b.

The expansion rings 32u,b may each be an annular member having a base portion of a first diameter that steps up to a wedge portion of a second diameter. An inner surface of the wedge portion may taper outwardly from a longitudinal axis of the frac plug 18. The expansion rings 32u,b may further have a shoulder may be formed between the two portions. Each support cone 33u,b may have a cone portion and a support portion. The cone portion of each support cone 33u,b may be complimentary tapered to the wedged portions of the respective expansion rigs 32u,b. Equally spaced longitudinal cuts may be fabricated in the wedge portion to create one or more wedges therebetween. The number of cuts may be determined by the size of the annulus to be sealed and the forces exerted on each expansion support ring 32u,b.

Figure 5A:
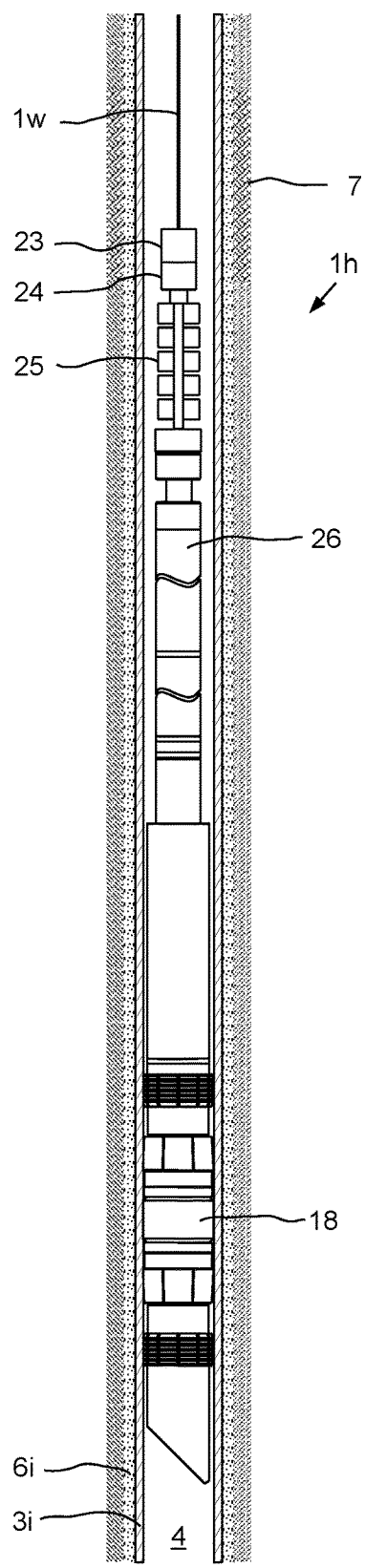
FIGS. 5A-5F illustrate a fracturing operation conducted using the system.
Figure 5B:
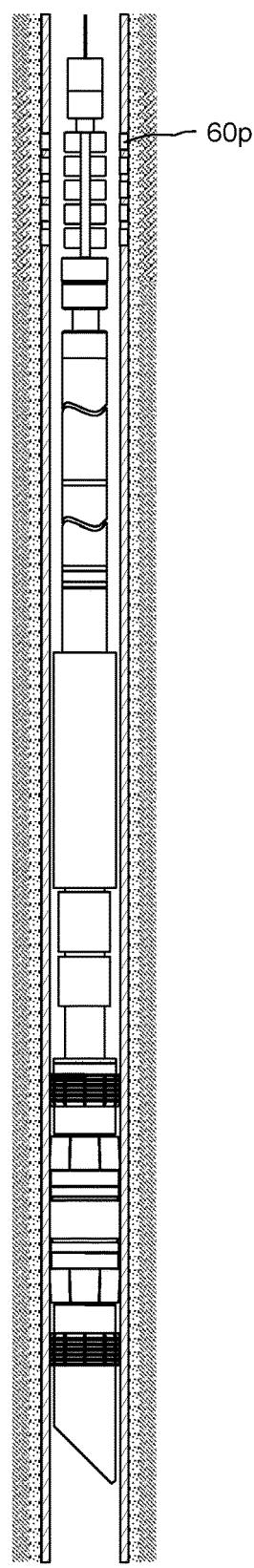
Figure 5C:
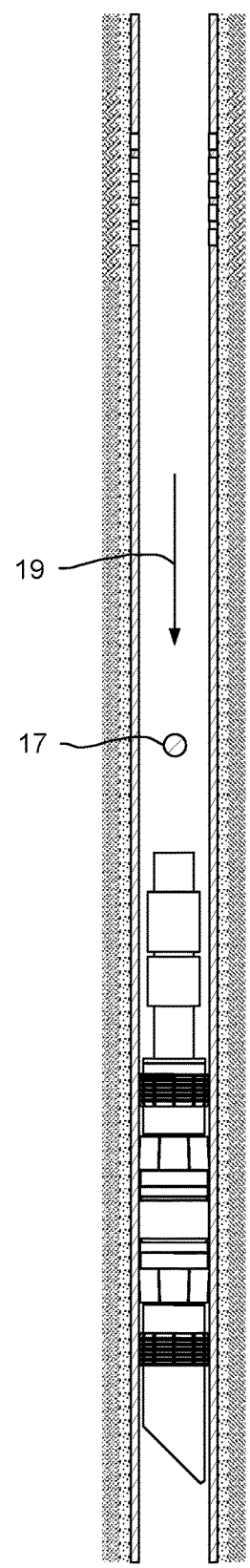
Figure 5D:
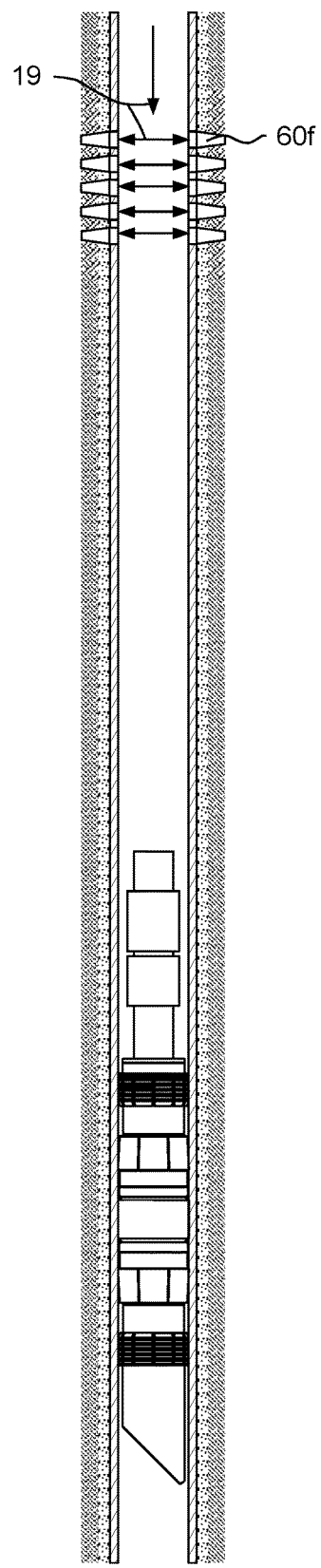
Figure 5E:
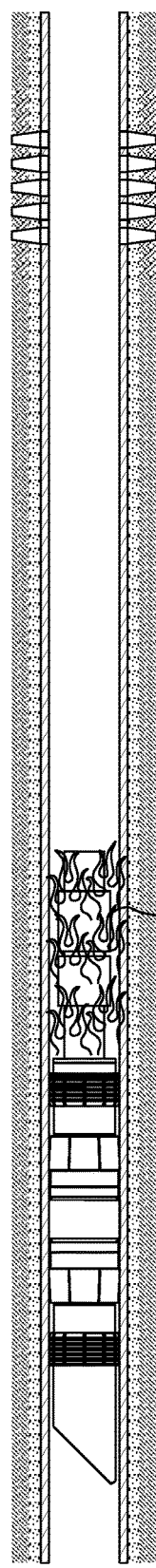
Figure 5F:
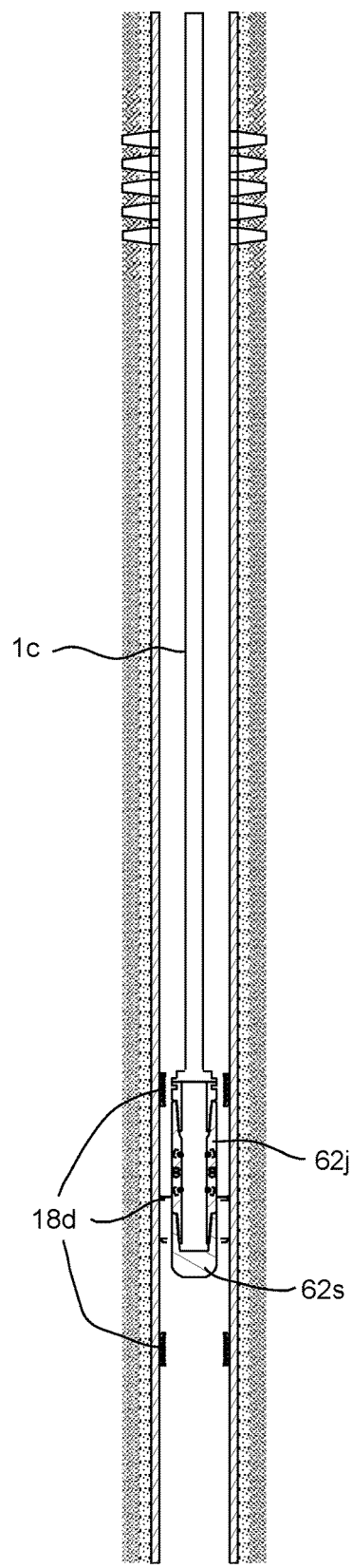

In operation, the angled wedges may pivot radially outward as each expansion ring 32u,b moves along the outer surface of each respective support cone 33u,b. The wedges may then sever from the base portion, and may extend radially to contact an inner surface of the inner casing 3i (FIG. 5A). The extended wedges may serve as a brake that prevents slippage of the frac plug 18 relative to the inner casing 3i. The support portion of each support cone 33u,b may abut the packing element 30. A reaction force exerted on each support cone by extension of the wedges may serve to anchor the support cone in place along the mandrel 27 to prevent longitudinal slippage of the expanded packing element 30.

The mandrel 27 may be a tubular member having a longitudinal bore formed therethrough. The mandrel 27 may have a body portion 27y, guide profile, such as a mule shoe 27m, formed at a lower end thereof, a shoulder 27s formed in an outer surface thereof for receiving the plug components 28-34, and a seat 27b formed in an inner surface thereof for receiving the ball 17.

The slips 28$u,b$ may each be disposed along the mandrel 27 adjacent the respective slip cone 29$u,b$. Each slip 28$u,b$ may include an inner base portion having a tapered inner surface conforming to the respective slip cone 29$u,b$ and an outer wedge portion split into a plurality of wedges. An outer surface of each wedge may have at least one outwardly extending serration to engage an inner surface of a the inner casing 3$i$ when the slips 28$u,b$ are driven radially outward from the mandrel 27 due to movement across the respective slip cones 29$u,b$. The slip base portions may each be designed to fracture with radial stress. Each slip base portion may include at least one recessed groove (not shown) milled therein to fracture under stress allowing the wedges to expand outward to engage the inner casing 3$i$.

Each slip cone 29$u,b$ may be fastened to the mandrel 27, such as by one or more respective shearable pins 36$u,b$, screws, or ring. Each of the slip cones 29$u,b$ may have an undercut formed in an end thereof for receiving the base portion of the respective expansion ring 32$u,b$. A setting ring 37 may be disposed along the mandrel 27 adjacent the upper slip 28$u$ for receiving the setting piston 26$s$. The setting ring 37 may be captured on the mandrel 27 by a stop 38. The stop 38 may be an annular member and fastened to the mandrel 27, such as by one or more pins 39$a,b$, screws, or snap ring.

Alternatively, each support cone may be two separate tapered members and one member made from the engineering polymer such that it may extrude to fill voids between the wedges. Alternatively, the frac plug may further include a ball cage and the ball trapped in the ball cage. Alternatively, the frac plug may further include a bore plug disposed in the mandrel bore or a solid mandrel, thereby converting the frac plug to a bridge plug.

Figure 3A:
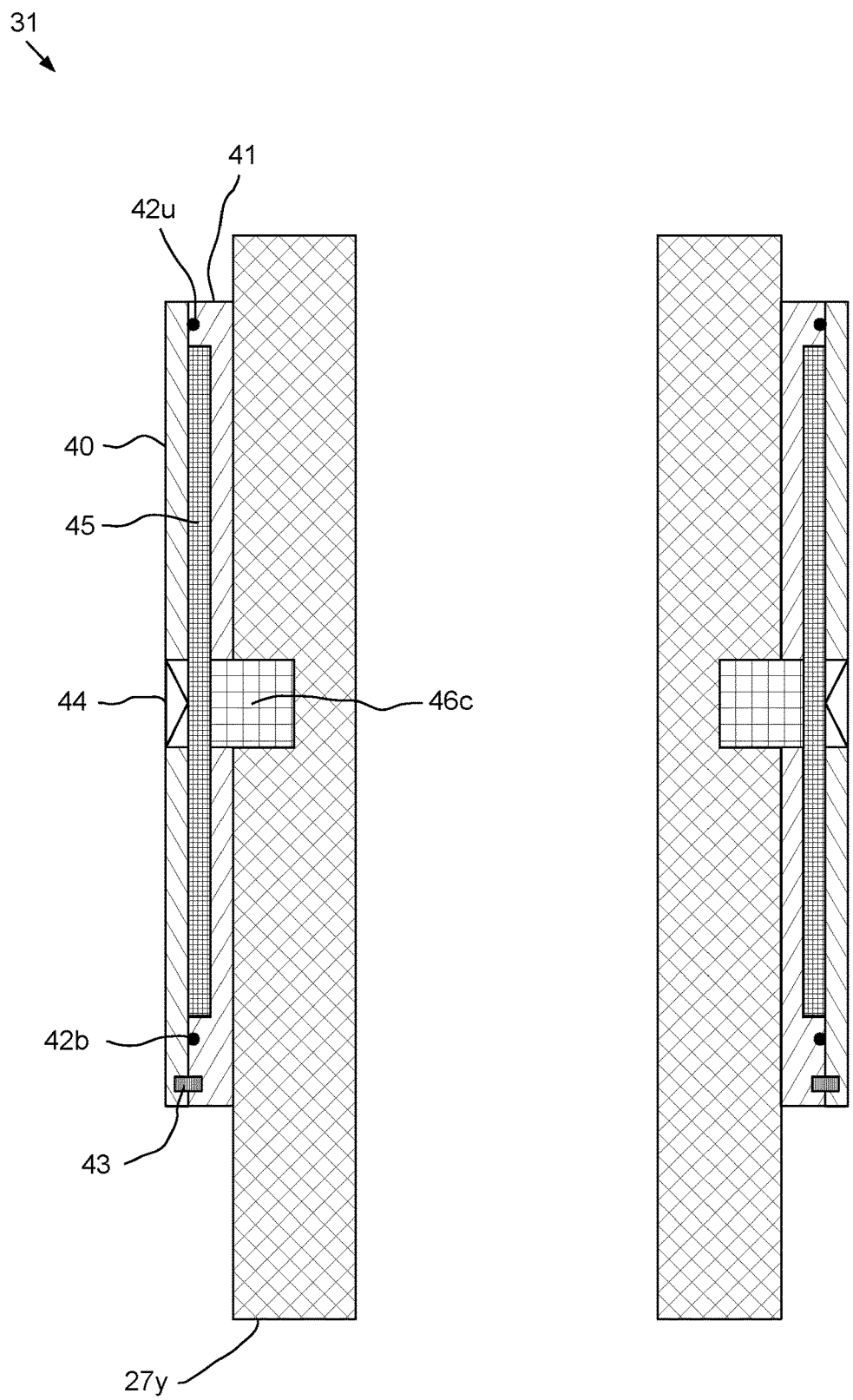
FIG. 3A illustrates an igniter of the frac plug.
Figures 3B, 3C:
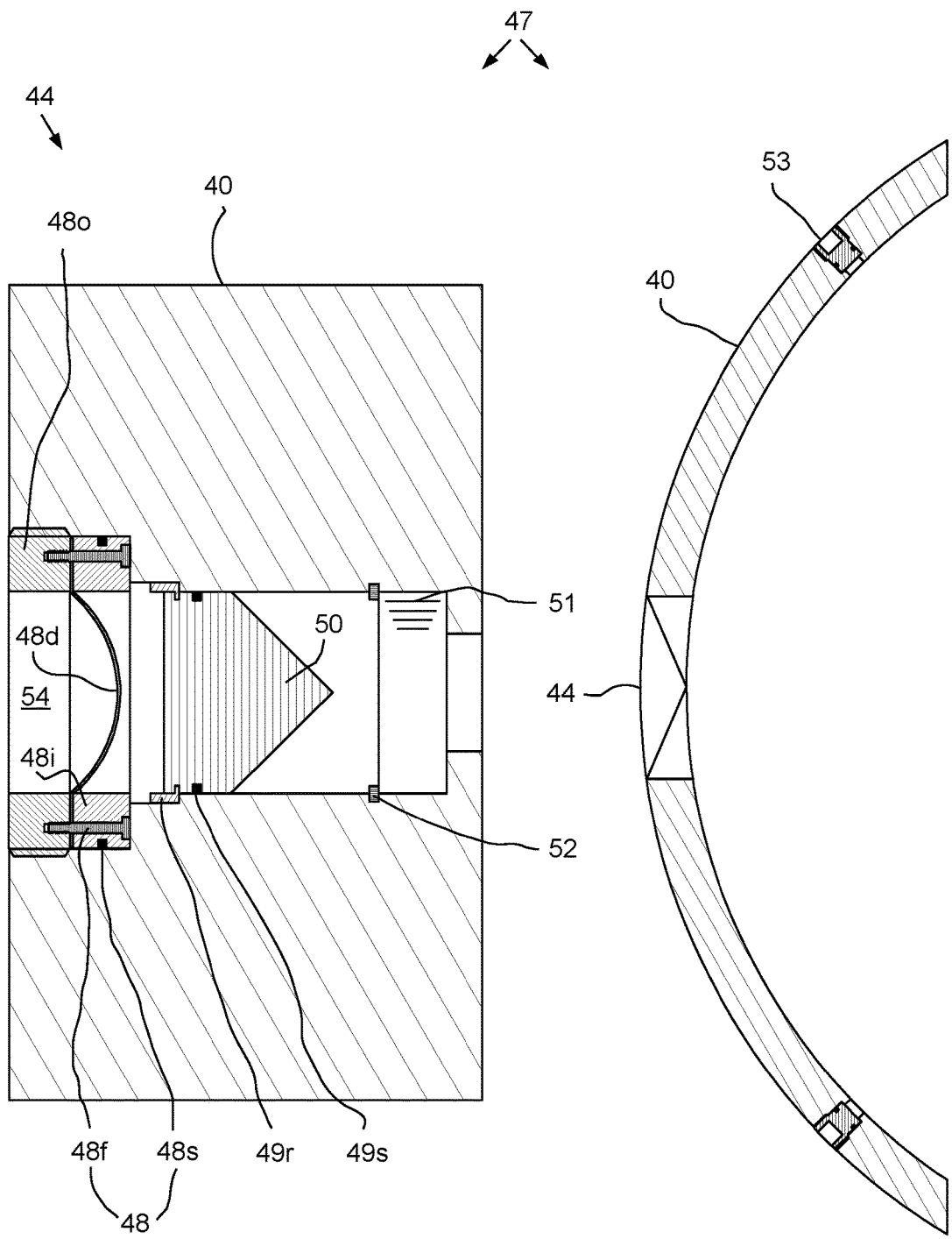
FIGS. 3B and 3C illustrate a trigger of the igniter.

FIG. 3A illustrates the igniter 31. FIGS. 3B and 3C illustrate a trigger 47 of the igniter 31. The igniter 31 may include an upper portion of the mandrel body 27$y$, an inner housing 41, a pyrogen charge 45, one or more (two shown) pyrotechnic composition charges (PCCs) 46$c$, and the trigger 47. The trigger 47 may include a outer housing 40, one or more strikers 44, and one or more solute plugs 53. Each striker 44 may include a pressure relief device 48, a plunger 50, a solvent 51, and a pressure port 54.

The outer housing 40 and inner housing 41 may each be made from the non-steel metal or alloy. The inner housing 41 may be connected to the mandrel 27, such as by bonding with an adhesive. The inner housing 41 may have upper and lower shoulders formed at ends thereof to engage the outer housing 40, thereby defining an annular chamber between the inner and outer housings. The inner housing 41 may also have one or more charge ports formed through a wall thereof for receiving the respective PCCs 46$c$. The mandrel body 27$y$ may also have one or more sockets formed in an outer surface thereof for receiving the respective PCCs 46$c$. Each inner housing shoulder may also have a groove formed therein for receiving a seal, such as an o-ring 42$u,b$. The outer housing 40 may be fastened to the inner housing 41, such as by a snap ring 43 or screws or bonded thereto.

Figure 4A:
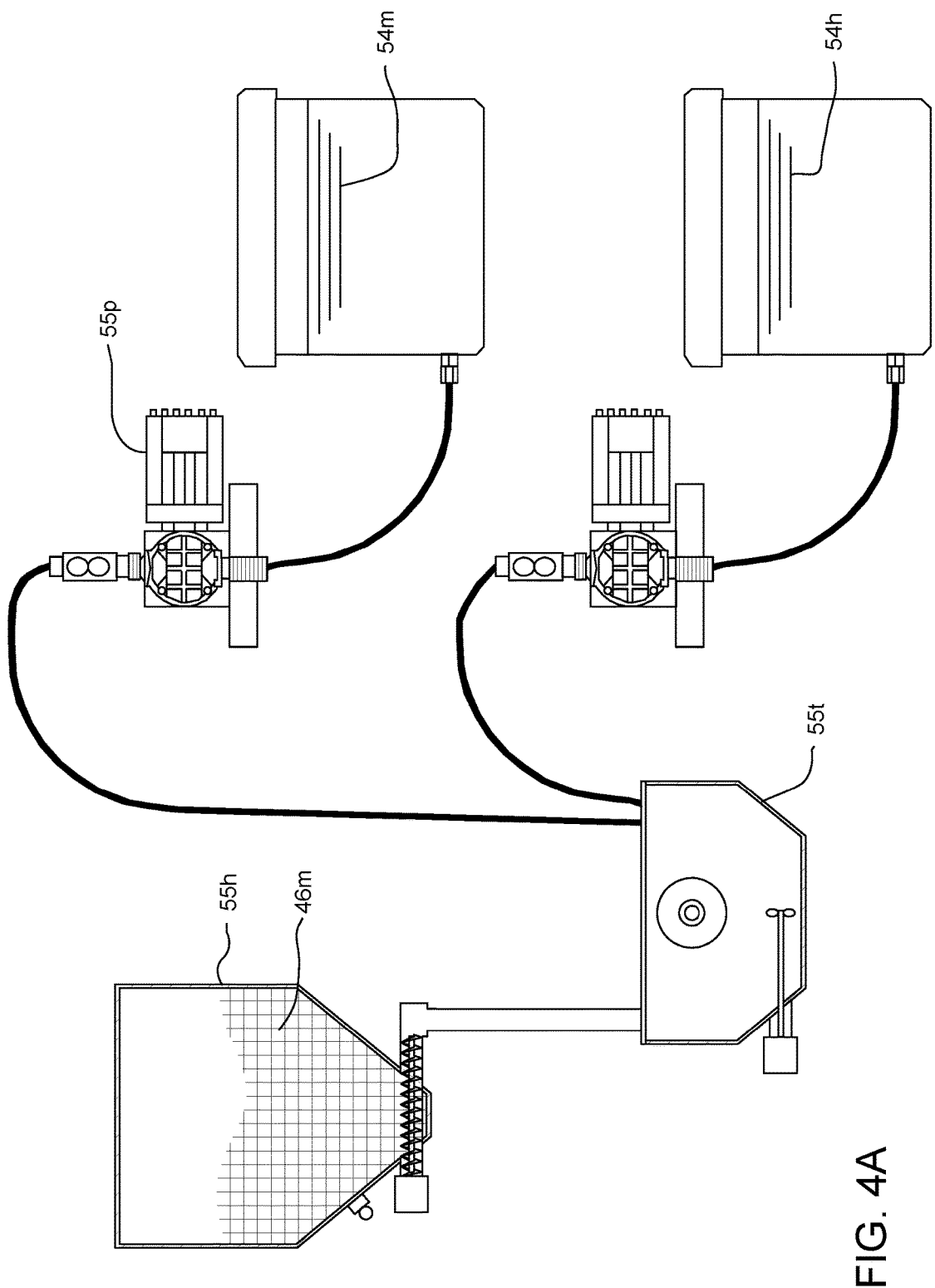
FIGS. 4A and 4B illustrate a manufacturing system for a mandrel of the frac plug.

The pyrogen charge 45 may be a powder or ribbons made from a water-reactive agent, such as magnesium, and having an ignition temperature sufficient to ignite the PCCs 46$c$. The PCCs 46$c$ may each be made from a pyrotechnic composition 46$m$ (FIG. 4A). The pyrotechnic composition 46$m$ may include a fuel and an oxidant and may be thermite or thermate. Each PCC 46$c$ may be a pellet of the pyrotechnic composition 46$m$.

Alternatively, the pyrogen charge may further include an oxidant or be a mixture of the pyrotechnic composition and water-reactive agent. Alternatively, the pyrogen agent may react with other components of wellbore fluid or chemicals injected into the well. Alternatively, the PCC 46$c$ may be a tube made of the mandrel material (discussed below) and packed with the water-reactive agent and/or pyrotechnic composition. The alternative tube may also have diffusion holes formed through a wall thereof.

The pressure relief device 48 may include a rupture disk 48$d$ and a pair of flanges 48$i,o$. The pressure port 54 may be formed through a wall of the outer housing 40. The pressure port 54 may have a first shoulder formed therein for receiving the flanges 48$i,o$ and be threaded. One of the flanges 48$o$ may be threaded for fastening the pressure relief device 48 to the outer housing 40. The rupture disk 48$d$ may be metallic and have one or more scores formed in an inner surface thereof for reliably failing at a predetermined rupture pressure. The rupture disk 48$d$ may be disposed between the flanges 48$i,o$ and the flanges connected together, such as by one or more fasteners 48$f$. The flanges 48$i,o$ may carry one or more seals 48$s$ for preventing leakage around the rupture disk 48$d$.

The plunger 50 may be disposed in the pressure port 54 and fastened to the outer housing 40, such as by a shearable ring 49$r$. The shearable ring 49$r$ may be received by a second shoulder of the pressure port 54. The plunger 50 may have a cylindrical portion and a conical portion. The cylindrical portion may have a first groove for receiving the shearable ring 49$r$ and a second groove for receiving a seal, such as an o-ring 49$s$. The solvent 51 may be contained in a frangible container, such as a glass vial. The glass vial may be fastened to the outer housing 40, such as by entrapment between a third shoulder of the pressure port 54 and a stop, such as snap ring 52. The outer housing 40 may further have one or more ignition ports formed through as wall thereof. A solute plug 53 may be disposed in each ignition port and fastened to the housing, such as by a threaded connection.

In operation, the rupture pressure may correspond to a fracture pressure of the production zone 7. The disk 48$d$ may be operable to rupture at commencement of the fracturing operation thereby opening the pressure port 54. The fracture pressure may exert a fluid force on the plunger 50, thereby fracturing the shearable ring 49$r$ and propelling the plunger into the glass vial containing the solvent 51. The solvent 51 may be expelled into the annular chamber in communication with the solute plugs 53. The solvent 51 and solute may be a soluble pair, such as an acid and metal. The solvent 51 may gradually dissolve the solute plugs 53 until the pressure capability thereof is compromised, thereby leaking fracturing fluid 19 through the ignition ports and into the annular chamber. The solute plugs 53 may be configured to withstand attack by the solvent 51 for a predetermined time period sufficient to complete the fracturing of the production zone 7. The pyrogen charge 45 may react with water in the fracturing fluid 19, thereby combusting and heating the PCCs 46$c$ to ignition temperature. The PCCs 46$c$ may in turn ignite the mandrel 27.

Figure 4B:
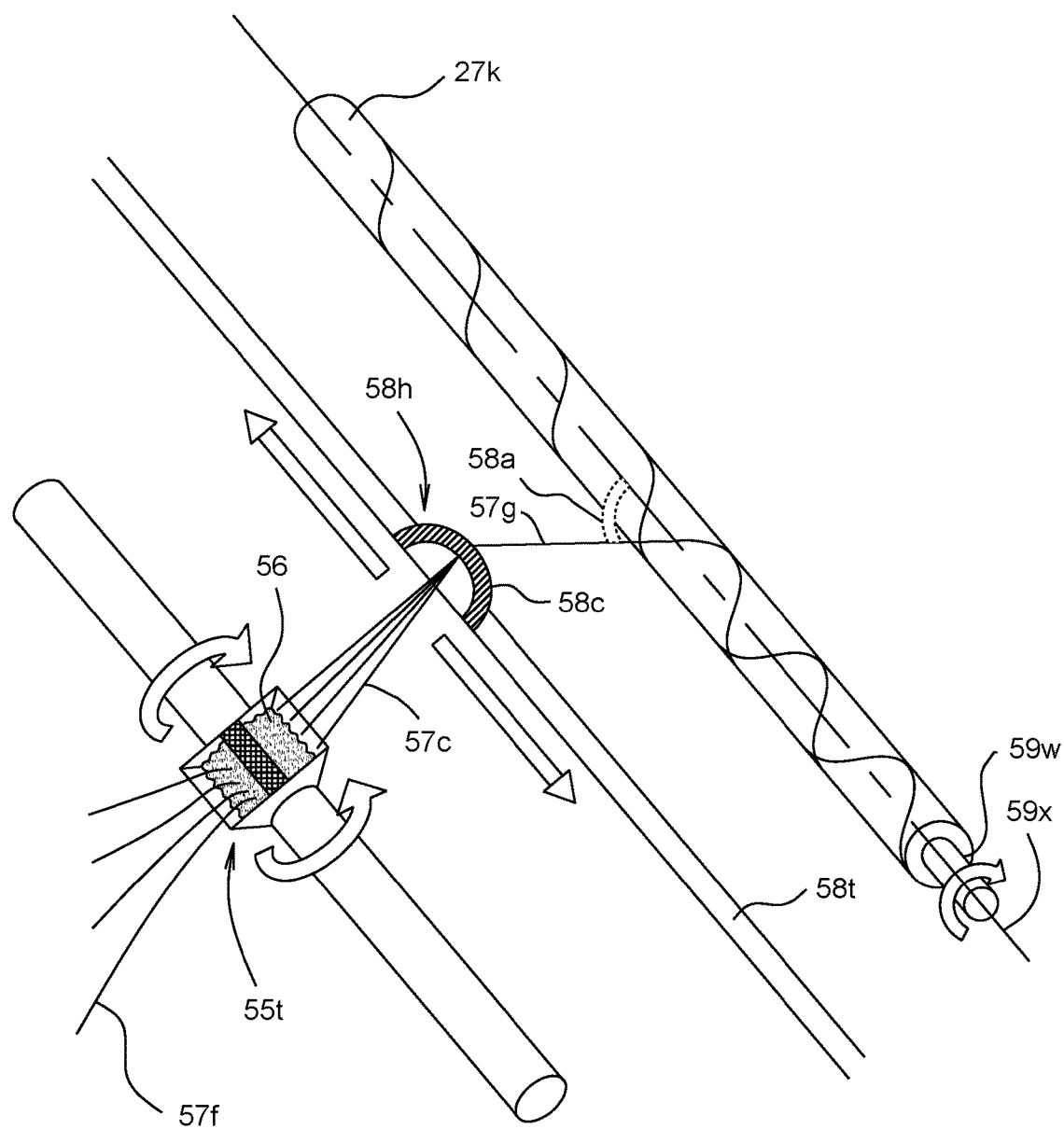

FIGS. 4A and 4B illustrate a manufacturing system for the mandrel 27. The manufacturing system may include two or more liquid tanks, a metering pump 55$p$ for each liquid tank, a metering hopper 55$h$, and a mixing trough 55$t$. An inlet of each metering pump 55$p$ may be connected to the respective liquid tank. A first of the liquid tanks may include a first polymer reagent, such as epoxide 54$m$, and a second of the tanks may include a second polymer reagent, such as polyamine 54$h$. The metering hopper 55$h$ may include the pyrotechnic composition 46$m$ in powder or nanoparticle form.

In operation, the metering pumps 55p and metering hopper 55m may be operated to dispense proportionate quantities of the reagents 54m,h and the PCC 46 into the mixing trough 55t. The mixing trough 55t may then mix the quantities into a resin 56. The resin 56 may include an uncured polymer, such as epoxy, infused with the pyrotechnic composition particulates.

Alternatively, the first reagent may be isocyanate and the second reagent may be polyol. Alternatively, the first reagent may be phenol and the second reagent may be formaldehyde. Alternatively, the manufacturing system may include a third liquid tank containing a diluent and a third metering pump for dispensing the diluent into the mixing trough or one or both of the reagents may be pre-diluted.

Once the resin 56 has been mixed, a blank 27k of the mandrel 27 may be formed by filament winding. Continuous fibers 57f, such as glass, carbon, or aramid (including para-aramids and meta-aramids) fibers, may be fed through the mixed resin 56 via one or more sheaves of the mixing trough 55t, thereby coating the fibers with the resin. The coated fibers 57c may continue into a fiber placement hood 58h. The fiber placement hood 58h may consolidate the multiple coated fibers 57c into a fiber bundle 57g and feed the fiber bundle to a winding mandrel 59w, thereby forming the plug mandrel blank 27k.

The fiber placement hood 58h and the winding mandrel 59w may be positioned parallel to one another. The fiber placement hood 58h may include a carriage 58c and a track 58t. The carriage 58c may be reciprocated along a longitudinal axis of the track 58t, such as by a linear actuator (not shown). As the carriage 58c is translated along the track 58t, the winding mandrel 59w may be rotated about a winding axis 59x, such as by an electric motor (not shown). As the fiber bundle 57g is fed from the fiber placement hood 58h to the rotating winding mandrel 59w, the fiber placement hood 58h may dispense the fiber bundle 57g to the winding mandrel at a winding angle 58a relative to the winding axis 59x. The winding angle 58a may range from thirty to seventy degrees. The winding angle 58a of the fiber placement hood 58h may be altered by adjusting the speed that the carriage 58c translates along the track 58t relative to the angular speed of the winding mandrel 59w. Each pass of the carriage 58c along the track 58t may form a respective layer of the mandrel blank 27k and the carriage may be reciprocated until a desired outer diameter of the blank 27k is formed.

Once the mandrel blank 27k has been formed, the mandrel blank and winding mandrel 59w may be placed in an oven (not shown) and heated and/or irradiated to cure the resin 56. After curing, the mandrel blank 27k may be removed from the winding mandrel 59w and machined to form the plug mandrel 27.

Alternatively, the fibers 57f may be pre-impregnated with the resin 56 and dry wound or post-impregnated with the resin. Alternatively, the mandrel blank 27k may be formed by pultrusion. Alternatively, the mandrel blank 27 may be compression molded, injection molded, or reaction injection molded using mats impregnated with the resin 56 or a mixture of the resin 56 and chopped fiber. Alternatively, other plug components, such as the cones 29u,b, 33u,b and/or fasteners 35, 36u,b, 39a,b, may be made using the resin 56 or coated fibers 57c. Alternatively, a tubular for a downhole tool may be made instead of the mandrel blank 27k.

FIGS. 5A-5F illustrate a fracturing operation conducted using the system 1. The BHA 1h may be deployed into the wellbore 4 using the wireline 1w with assistance from the fracture pump 15. The fracture pump 15 may be operated to pump displacement fluid (not shown) just before the BHA 1h has been inserted into the wellbore 4. Pumping of the displacement fluid may increase pressure in the inner casing bore until a differential is sufficient to open a toe sleeve (not shown) of the inner casing string 3i. Once the toe sleeve has been opened, the BHA 1h may be inserted into the wellbore 4 and continued pumping of the displacement fluid may drive the BHA 1h to a setting depth below the production zone 7. The displaced fluid may be forced into the lower formation 5b via the open toe sleeve.

Once the BHA 1h has been deployed to the setting depth, the frac plug 18 may be set by supplying electricity to the BHA at a first polarity via the wireline 1w to activate the setting tool 26. As discussed above, the setting piston 26s may be driven toward the mule shoe 27m while the wireline 1w restrains the setting mandrel 26m and plug mandrel 27, thereby compressing the packing element 30 and driving the slips 28u,b along the respective slip cones 29u,b. The packing element 30 may be radially expanded into engagement with the inner casing string 3i and the slips 28u,b may be radially extended into engagement with the inner casing.

A tensile force may then be exerted on the BHA 1h by pulling the wireline 1w from the surface 5s to fracture the shearable pins 35, thereby releasing the frac plug 18 from the rest of the BHA 23-26. The remaining BHA 23-26 may then be raised using the wireline 1w until the perforation guns 25 are aligned with the production zone 7. Electricity may then be resupplied to the remaining BHA 23-26 via the wireline 1w at a second polarity to fire the perforation guns 25 into the inner casing 3i, thereby forming perforations 60p. Once the perforations 60p have been formed, the remaining BHA 23-26 may be retrieved to the lubricator 1b and into the tool housing 20 using the wireline 1w. The lubricator shutoff valve 8f may then be closed.

The ball 17 may then be released from the launcher 14 and the fracturing fluid 19 may be pumped from the mixer 16 into the injector head 10 via the valve 11 by the fracture pump 15. As discussed above, the fracturing fluid 19 may be a slurry including: proppant (i.e., sand), water, and chemical additives. Continued pumping of the fracturing fluid 19 may drive the ball 17 toward the frac plug 18 until the ball lands onto the plug mandrel seat 27b, thereby closing the plug mandrel bore.

Continued pumping of the fracturing fluid 19 may exert pressure on the seated ball 17 until pressure in the inner casing string 3i increases to force the fracturing fluid (above the seated ball) through the perforations 60p, cement 6i and into the production zone 7 by creating a fracture 60f. The increased pressure may also fracture the rupture disk 48d and drive the plunger 50 into the solvent vial of the trigger 47. As discussed above, the proppant may be deposited into the fracture 60f by the fracturing fluid 19. Pumping of the fracturing fluid 19 may continue until a desired quantity has been pumped into the production zone 7. Once the solute plugs 53 are compromised by the solvent 51, the igniter 31 may initiate incineration 61 of the plug mandrel 27. Once the plug mandrel 27 has been incinerated 61 leaving only plug debris 18d, one or more additional production zones (not shown) may be fractured using one or more additional respective BHAs (not shown) in a similar fashion.

Once the fracturing operation of all the production zones 7 has been completed, the lubricator 1b and injector head 10 may be removed from the tree 1p. The flow cross 9 may be connected to a disposal pit or tank (not shown) and fracturing fluid 19 allowed to flow from the wellbore 4 to the pit. A work string, such as coiled tubing 1c, and an additional BHA 62*j,s* may be deployed into the wellbore 4 using a coiled tubing unit (CTU) (not shown). The CTU may include an injector, a reel of the coiled tubing 1*c*, a tool housing, a stuffing box, one or more BOPs and a shutoff valve. The BHA 62*j,s* may include a jetting tool 62*j* and a guide shoe 62*s*. The injector may be operated to lower the coiled tubing 62*c* and BHA 62*j,s* into the wellbore 4 and the fracture pump 15 operated to inject washing fluid through the BHA 62*j,s* to the jetting tool 62*j*. The jetting tool 62*j* may spray the washing fluid against the inner casing string 3*i* to dislodge the plug debris 18*d* and the returning washing fluid may carry the plug debris to the surface for disposal. The BHA 62*j,s* and coiled tubing 62*c* may then be retrieved to the surface 5*s* and the CTU removed from the tree 1*p*. A production choke (not shown) may be connected to the flow cross 9 and to a separation, treatment, and storage facility (not shown). Production of the fractured zones 7 may then commence.

Alternatively, the CT BHA may include a drilling motor, such as a mud motor, and one or more mill bits. The milling BHA may then be operated by pumping milling fluid through the coiled tubing to mill the plug debris and the milling fluid may return the milled debris to the surface.

Figure 6A:
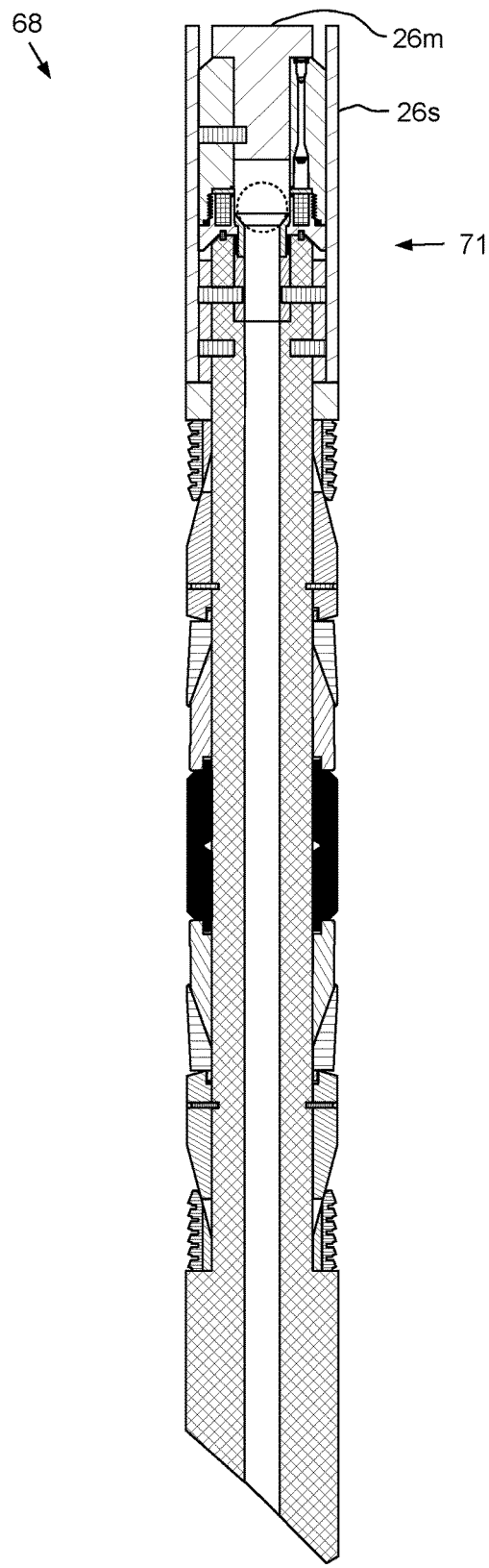
FIG. 6A illustrates an alternative consumable frac plug, according to another embodiment of the present invention.
Figure 6B:
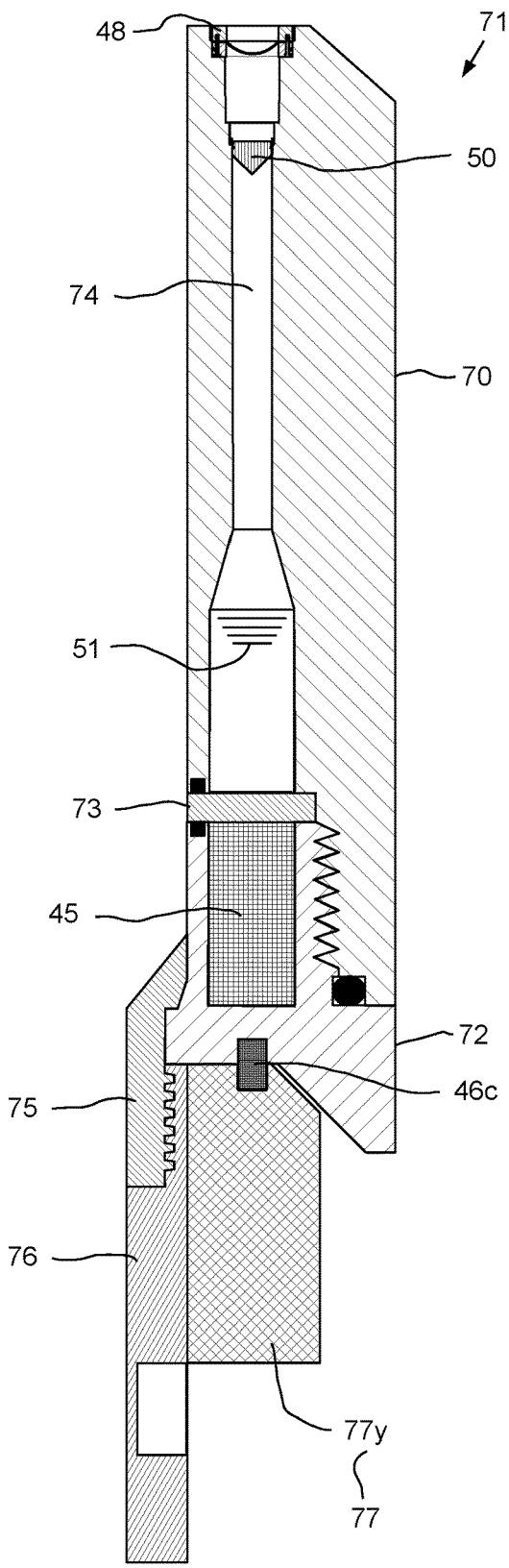
FIG. 6B illustrates an igniter of the alternative frac plug.

FIG. 6A illustrates an alternative consumable frac plug 68, according to another embodiment of the present invention. FIG. 6B illustrates an igniter 71 of the alternative frac plug 68. The frac plug 68 may include a consumable mandrel 77, the slips and the slip cones, the packing, and an igniter 71. The igniter 71 may include an upper portion of the mandrel body 77*y*, a ball seat 75, a inner housing 72, the pyrogen charge 45, the PCC 46*c*, and a trigger. The trigger may include an outer housing 70, one or more strikers, and a solute strip 73. Each striker may include the pressure relief device 48, a plunger 50, the solvent 51, and a pressure port 74. The alternative frac plug 68 may operate in a similar fashion to the frac plug 18. The pressure port 74 may be a longitudinal passage formed through the housing 70.

Alternatively, the pressure port may be a radial passage having the pressure relief device and plunger disposed therein and the longitudinal passage may be used for containing the solvent vial.

FIG. 7A illustrates an electronic trigger 80 for use with either igniter 31, 71, according to another embodiment of the present invention. The electronic trigger 80 may include a timer battery 81, a pressure switch 82, an electronic timer switch 83, an ignition battery 84, and an ignition valve 85. The trigger 80 may function in a similar fashion to the trigger 47. The pressure switch 82 may close in response to fracture pressure. Closing of the pressure switch 82 may supply electricity to the electronic timer switch 83 from the timer battery 81. The electronic timer switch 83 may commence countdown in response to being powered and close at the end of countdown, thereby supplying electricity to the ignition valve 85 from the ignition battery 84. The ignition valve 85 may be an actuated shutoff valve disposed in each ignition port of the outer housing 40 instead of the respective solute plug 53 or in place of the solute disk 73. The ignition valve 85 may fail to the closed position and open in response to being powered by the ignition battery 84.

Alternatively, capacitors or inductors may be used instead of one or both of the batteries 81, 84. Alternatively, the trigger may include an electric match instead of the valve and the pyrogen may be a pyrotechnic composition.

FIG. 7B illustrates an alternative switch 86 for the electronic trigger 80, according to another embodiment of the present invention. The alternative switch 86 may replace the pressure switch 86 and close in response to seating of the ball 17 in the ball seat 27*b*, 75.

Alternatively, the switch may close in response to disconnection of the setting tool from the frac plug.

FIG. 8 illustrates an alternative manufacturing system for an alternative consumable mandrel (not shown), according to another embodiment of the present invention. The manufacturing system may include the metering hopper 55*h*, an extrusion die 91, a press 92, a heater 93, and a spool 94. The metering hopper 55*h* may dispense the pyrotechnic composition 46*m* into the die 91. A dispensing port of the die may then be closed and a protective atmosphere 95 established around the die 91 and the spool 94. The heater 93 may be operated to heat the die 91 and pyrotechnic composition 46*m*. The press 92 may then be operated to extrude the heated pyrotechnic composition 46*m* through an extrusion port of the die 91, thereby sintering the pyrotechnic composition particulates into a fiber. The spool 94 may then be rotated to wind the sintered fiber. The sintered pyrotechnic composition fiber may then be used instead of one of the fibers 57*f* of the filament winding system of FIG. 4B with a non-infused resin.

Alternatively, the pyrotechnic composition may be cold pressed into a billet and the billet loaded into the die 91 and then hot extruded into a sintered fiber. Alternatively, the sintered fiber may be used in conjunction with the infused resin 56 to manufacture the plug mandrel.

While the foregoing is directed to embodiments of the present invention, other and further embodiments of the invention may be devised without departing from the basic scope thereof, and the scope thereof is determined by the claims that follow.

The invention claimed is:

1. A method of fracturing a production zone in a wellbore, comprising:
   deploying a packer or plug into the wellbore, the packer or plug comprising a composite material made from a pyrotechnic composition;
   perforating a casing of the wellbore adjacent the production zone;
   fracturing the production zone; and
   chemically reacting a charge of the packer or plug with a wellbore fluid so that the chemical reaction between the charge and the wellbore fluid ignites to ignite the packer or plug.

2. The method of claim 1, further comprising exposing the charge of the packer or plug to the wellbore fluid after fracturing the production zone.

3. The method of claim 1, further comprising exposing the charge of the packer or plug to the wellbore fluid after a predetermined time period.

4. The method of claim 1, further comprising operating an igniter to expose the charge of the packer or plug to the wellbore fluid.

5. The method of claim 1, further comprising closing a bore of the packer or plug before fracturing the production zone.

6. The method of claim 1, further comprising deploying a second packer or plug into the wellbore;
   perforating the casing of the wellbore adjacent a second production zone; and
   fracturing the second production zone.

7. The method of claim 6, wherein the second packer or plug comprises a composite material made from a pyrotechnic composition.

8. The method of claim 6, further comprising exposing a charge of the second packer or plug to the wellbore fluid to ignite the second packer or plug.

9. The method of claim 1, wherein the charge reacts with water in the wellbore fluid.

10. The method of claim 1, further comprising initiating combustion of a mandrel of the packer or plug.

11. A method of fracturing a production zone in a wellbore, comprising:
- deploying a packer or plug into the wellbore, the packer or plug comprising a composite material made from a pyrotechnic composition;
- perforating a casing of the wellbore adjacent the production zone;
- fracturing the production zone;
- exposing a charge of the packer or plug to a wellbore fluid to ignite the packer or plug; and
- operating an igniter to expose the charge of the packer or plug to the wellbore fluid, wherein operating the igniter comprises:
  - opening a pressure port of the igniter;
  - releasing a solvent into an annular chamber of the packer or plug; and
  - dissolving at least one solute plug to expose the annular chamber to the wellbore fluid.

12. A method of fracturing a production zone in a wellbore, comprising:
- deploying a packer or plug into the wellbore, the packer or plug comprising a composite material made from a pyrotechnic composition;
- perforating a casing of the wellbore adjacent the production zone;
- fracturing the production zone;
- exposing a charge of the packer or plug to a wellbore fluid to ignite the packer or plug; and
- operating an igniter to expose the charge of the packer or plug to the wellbore fluid, wherein operating the igniter comprises:
  - increasing a pressure in the wellbore to a predetermined pressure;
  - operating a switch in response to the predetermined pressure; and
  - opening a valve to expose an annular chamber of the packer or plug to the wellbore fluid.

13. The method of claim 12, wherein the predetermined pressure corresponds to a fracturing pressure for the production zone.

* * * * *